United States Patent
Eymüller et al.

[11] Patent Number: 5,172,611
[45] Date of Patent: Dec. 22, 1992

[54] ENGINE-RPM-DEPENDENT ARREST DEVICE TO PREVENT NON-PERMITTED DOWN SHIFTS IN MOTOR VEHICLE GEARBOXES

[75] Inventors: Helmut Eymüller; Siegfried Stützle; Jürgen Legner; Gerhard Buck, all of Friedrichshafen, Fed. Rep. of Germany

[73] Assignee: Zahnradfabrik Friedrichshafen AG, Fed. Rep. of Germany

[21] Appl. No.: 768,641
[22] PCT Filed: Apr. 5, 1990
[86] PCT No.: PCT/EP90/00531
§ 371 Date: Sep. 27, 1991
§ 102(e) Date: Sep. 27, 1991
[87] PCT Pub. No.: WO90/12228
PCT Pub. Date: Oct. 18, 1990

[30] Foreign Application Priority Data
Apr. 8, 1989 [DE] Fed. Rep. of Germany ....... 3911519

[51] Int. Cl.$^5$ .............................................. B60K 41/06
[52] U.S. Cl. ......................................... 74/869; 74/868; 74/878
[58] Field of Search ................... 74/867, 868, 869, 878

[56] References Cited
U.S. PATENT DOCUMENTS

| | | | |
|---|---|---|---|
| 3,937,107 | 2/1976 | Lentz | 74/861 |
| 4,680,989 | 7/1987 | Sykora et al. | 74/878 X |
| 4,903,551 | 2/1990 | Hiramatsu et al. | 74/878 X |
| 5,005,445 | 4/1991 | Gierer | 74/878 |
| 5,079,973 | 1/1992 | Ookubo et al. | 74/878 X |

FOREIGN PATENT DOCUMENTS

| | | |
|---|---|---|
| 0083855 | 7/1983 | European Pat. Off. |
| 1946496 | 3/1971 | Fed. Rep. of Germany |
| 2040195 | 2/1972 | Fed. Rep. of Germany |
| 2604593 | 8/1977 | Fed. Rep. of Germany |

Primary Examiner—Richard Lorence
Assistant Examiner—Benjamin Levi
Attorney, Agent, or Firm—Davis, Bujold & Streck

[57] ABSTRACT

An engine-rpm-dependent arrest device to prevent non-permitted down shifts in motor vehicle transmissions containing a pilot valve (1) and a control valve (2), both having two shift positions. One shift position of the control valve (2) is engaged by the pressure acting upon a piston surface (36) of the control-valve piston (31) and exceeding a given value of an engine-rpm-dependent low-pressure pump (20). The control valve (2) is exclusively in contact with the pressure medium conveyed by the low-pressure pump (20) and controls the large end surface (40) and the annular surface (41) of a pilot-valve piston (38) designed as stepped piston. If when the high gear is engaged and the engine rpm is above a certain limit value, the gear-shift valve (7) is moved to its position for low gear, then an actuation of the actuation device (15) for the low gear is prevented via the pilot valve (1). At the same time the activation device (16) for the high gear remains actuated with shift pressure so that the high gear remains loaded.

6 Claims, 3 Drawing Sheets

ENGINE-RPM-DEPENDENT ARREST DEVICE TO PREVENT NON-PERMITTED DOWN SHIFTS IN MOTOR VEHICLE GEARBOXES

The invention concerns an engine-rpm-dependent arrest device to prevent non-permitted down shifts (hereinafter called a "down shift arrest device" for short) in motor vehicle transmissions having at least two shiftable gears with one gear-shift valve movable by the driver, one pilot valve with two shift positions and one control valve with two shift positions, according to the preamble of claim 1.

Such a down shift arrest device has been disclosed, for instance, in German Patent 20 40 195. The arrest device in said patent consists of two independent separate arrest devices which engage depending upon the traveling speed. One of the said separate arrest devices acts upon a group transmission rear-mounted on a four-gear transmission. Both gear steps of the group transmission are changed over by a pilot valve designated as a relay valve which is pilot controlled by a gear-shift valve designated as a pilot-control valve. The actual change-over is effected by a double-acting shift cylinder which corresponds to an activation device for the low and the high gear steps, respectively. By means of a low-pressure pump that works depending on the traveling speed, a down shift from the high gear group to the low gear group is prevented when the vehicle has exceeded a specific traveling speed corresponding to a given, but still permitted, rpm of the prime mover. By means of the said down shift arrest device an overspeed of the prime mover is prevented, which would occur if the change-over transmission were down shifted from the high gear range to the low gear range when the prime mover is at high speed.

The down shift arrest device already known is successfully used in practice. When used in certain vehicles such as mobile excavators and similar working machines, however, greater importance is attached to a simple arrangement of the pressure fluid lines (for instance, on account of the guiding of the lines from the upper to the lower chassis of the mobile excavator) which are required for the control and actuation of the transmission, and of the down shift arrest device.

Therefore, the invention is based on the problem of simplifying the already known, down shift arrest device in the sense that the number of necessary pressure medium pipes can be reduced. At the same time, however, the quality and reliability of the arrest device must be maintained.

This problem is solved by the engine-rpm-dependent arrest device characterized in claim 1. The invention, however, is not limited to the combinations of features of the claims. Other logical possible combinations of claims and individual features of the claims result for the expert as the problem arises.

The solution of the problem consists of a combination of individual features. The primary individual feature is that the control valve is exclusively in contact with the pressure medium conveyed by the low-pressure pump. This means that the control valve can be designed as an easily engageable piston valve without a high-pressure seal. The low-pressure flow controlled by the control valve is fed to the pilot valve for direct activation on the large end surface or on the annular surface of the pilot-valve piston designed as a stepped piston. For shifting the low gear, the force of the low pressure acting upon the annular surface is supported or the force of the low pressure acting upon the large end surface is overdriven by means of the force of the shift pressure acting upon the small end surface of the stepped piston. In a state of operation where the high gear is engaged and the prime mover and therewith the low-pressure pump revolve at high speed at which the given value of the pressure of the low-pressure pump is exceeded, an actuation of the actuation device of the low gear with shift pressure is prevented in that the first work line connection coordinated with the low gear is connected with the activation connection for the activation device of the high gear. A non-permitted down shift to the low gear is thereby prevented.

By virtue of this design according to the invention to which also belong the direct communication of two work lines leading to the gear-shift valve, the number of control and activation lines in the down shift arrest device can be reduced in comparison with the device already known.

By situating two change-over valves in the pilot valve, the shift strokes required for preventing an inadmissible down shift can be easily produced or shut off.

A high-pressure seal is situated between the part of the pilot valve that is actuatable with low pressure and the part which is actuatable with shift pressure, for reducing leakage.

To prevent an increase of pressure in the activation connection for the activation device of the low gear that could occur due to leakage in the pilot valve, there is situated in the pilot valve, a third change-over valve, which in its neutral position keeps open a communication between the second work line connection and the activation connection for the activation device of the low gear, but always shuts off said communication when the shift pressure is present in one of said connections.

The invention is explained in detail herebelow with reference to an embodiment shown in the drawings. In the drawings.

Figure 1:
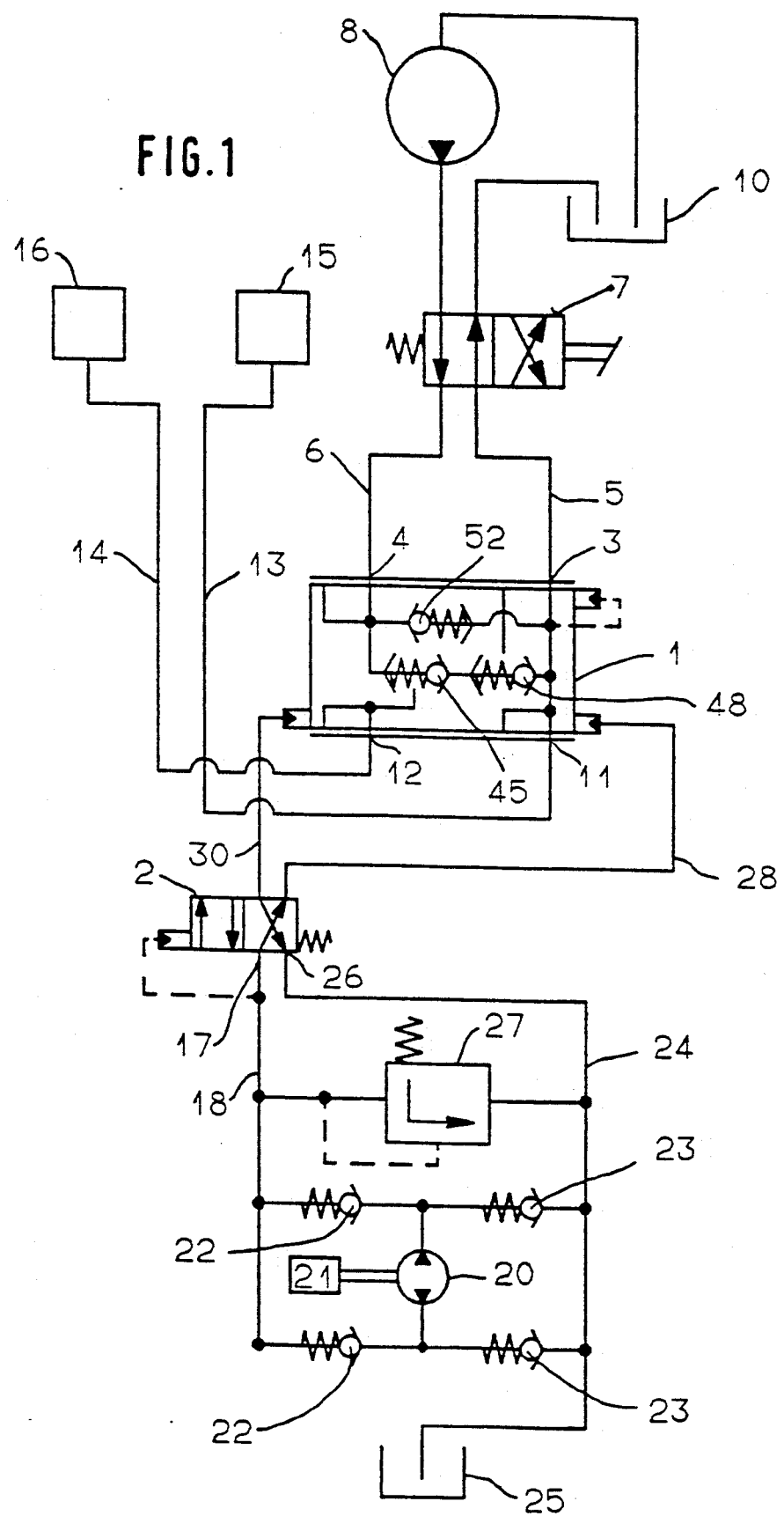
FIG. 1 is a circuit diagram schematically shown of the arrest device according to the invention.

The down shift arrest device contains a pilot valve 1 and a control valve 2, both of which have two possible shift positions. Pilot valve 1 has two connections 3 and 4 for two work lines 5 and 6 which lead to a gear-shift valve 7 and can be alternatively connected via gear-shift valve 7 with a servopump 8 or with a tank 10. Gear-shift valve 7 is movable by the driver.

Pilot valve has, in addition, two activation connections 11 and 12 which communicate via two activation lines 13 and 14, respectively, with two activation devices 15 and 16. Activation device 15 is formed by a clutch for shifting the low gear of a not shown motor vehicle transmission having two shiftable gears. Activation device 16 is formed by a brake for shifting the high gear of the motor vehicle transmission. Activation devices 15, 16 are conveniently designed as spring-accumulator clutches. For shifting the low gear, activation device 15 is actuated with shift pressure, while activation device 16 is vented. The corresponding also applies to the shifting of the high gear.

Control valve 2 has a pump connection 17 which communicates via a control line 18 with a low-pressure pump 20. Low-pressure pump 20 is in operative connection with a prime mover 21 so that its rpm is equal or proportional to the rpm of the prime mover. Low-pressure pump 20 is conveniently a pump which advances via check valves 22 in both directions of rotation in a manner known into the same control line 18 and via check valves 23 and a common return pipe 24 sucks pressure medium from a tank 25. Return pipe 24 is attached to control valve 2 in a return pipe connection 26.

Low-pressure pump 20 is conveniently protected via a pressure-relief valve 27. Pressure medium conveyed from low-pressure pump 20, and not needed for control of the pilot valve is conveniently fed via a nozzle (not shown) to the lubrication circuit of the motor vehicle transmission.

Control valve 2 is connected via two control ducts 28 and 30 with pilot valve 1.

In the control valve 2, between a control-valve piston 31 and a valve housing 32, two control edge pairs 33 and 34 are formed through which control ducts 28 and 30 can be alternatively connected with a pump connection 17 or with return-pipe connection 26. The control valve is pressed into one shift position in which conduct 28 is connected with pump connection 17 by the force of a compression spring 35. The other shift position of the control valve 2 is adjustable by the pressure of low-pressure pump 20 acting upon a piston surface 36 of control-valve piston 31, by which pressure exceeds a given value as selectable by compression spring 35.

Figure 2:
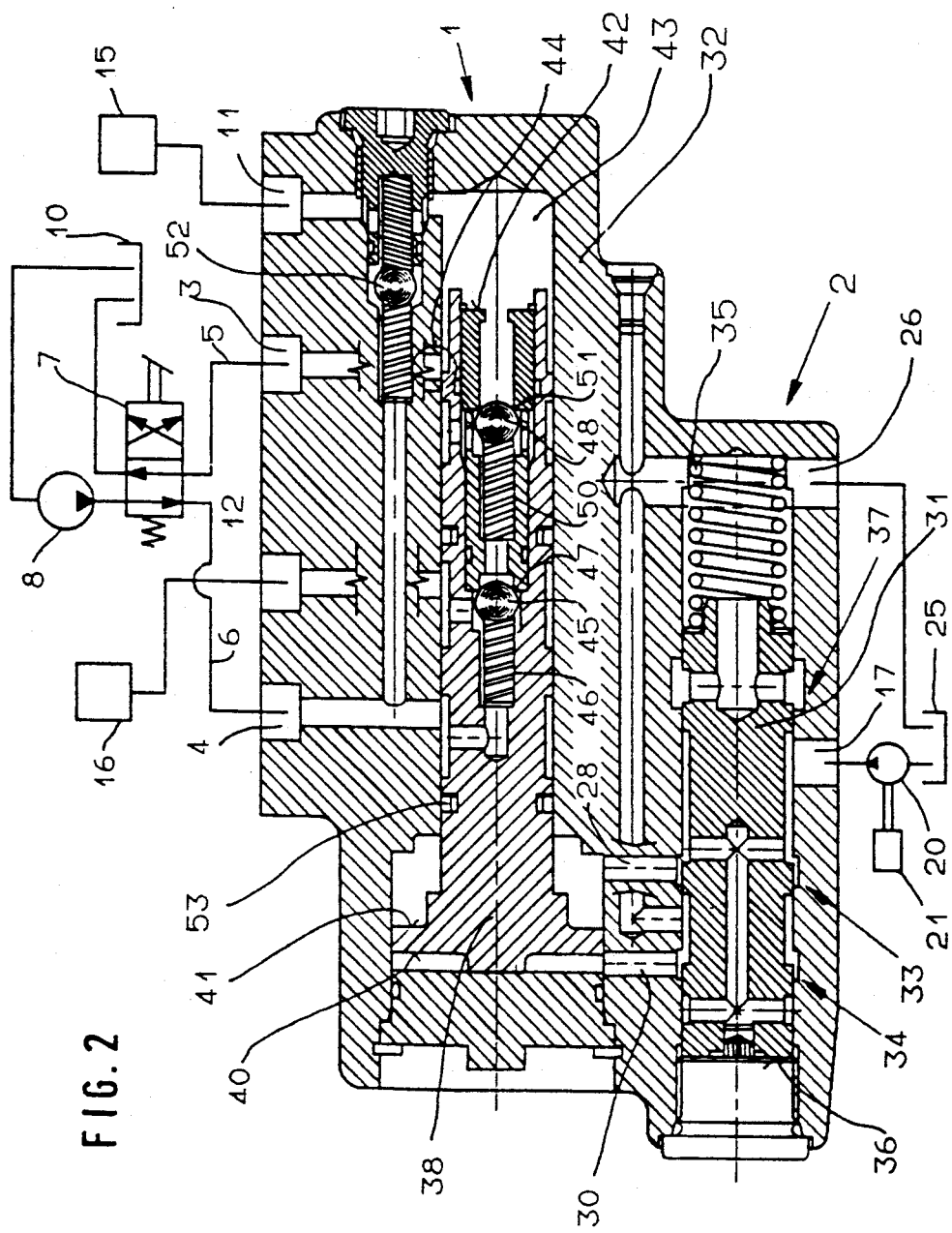
FIG. 2 is a longitudinal section through the arrest device with the pilot valve and control valve in their neutral positions and with the attached aggregates schematically shown.

According to the embodiment in FIG. 2, pressure-relief valve 27 is formed in the control valve by a third control edge pair 37 in combination with compression spring 35 and piston surface 36.

Pilot valve contains a pilot-valve piston 38 designed as a stepped piston. The large end surface 40 of the stepped piston communicates with control duct 30, annular surface 41 with control duct 28. Large end surface 40 and annular surface 41 thus form two piston surfaces actuatable with the pressure medium conveyed by low-pressure pump 20 and controlled by control valve 2.

The small end surface 42 of the stepped piston confines a cylinder space 43 which is in constant communication with the actuation connection for the actuation device 15 of the low gear. In the left shift position of pilot-valve piston 38 shown in FIG. 2, there is a communication from the first work line connection 3 to cylinder space 43. The small end surface 41 is thus actuatable with pressure medium under shift pressure which is conveyed by servopump 8. In pilot valve 1 a control edge pair 44 is situated by which the communication from first work line connection 3 to cylinder space 43 and thus to the activation connection 11 for activation device 15 of the low gear can be shut off by a movement to the right of pilot-valve piston 38.

In the pilot valve preferably in pilot-valve piston 38 thereof, a first change-over valve 45 is situated which is pressed by a compression spring 46 against its seat 47, to the right as shown in FIG. 2. In this neutral position of the first changeover valve 45, a communication exists between second work line connection 4 and activation connection 12 for the activation device 16 of the high gear.

In the pilot-valve piston 38 a second change-over valve 48 is situated which is pressed by a compression spring 50 against its valve seat 51, to the right as shown in FIG. 2. The precise position and the possibilities of the connections via both change-over valves 45 and 48 are indicated in more detail in the description of the operation of the down shift arrest device according to the invention.

A third change-over valve 52 is situated in valve housing 32 and creates a communication between second work line connection 5 and activation connection 11 for activation device 15 of the high gear whenever the same pressure prevails in both said connections. On the other hand, if in one of said connections the shift pressure produced by servopump 8 is present, said connection is shut off. Change-over valve 52 prevents any pressure build up caused by leakage when pilot-valve piston 38 is moved to the right in the cylinder space 43 and thus in activation connection 11.

In pilot-valve piston 38, a high-pressure seal 53 is situated which separates the part of the pilot valve 1 that is actuatable with low pressure and containing large end surface 40 and annular surface 41 from the part of pilot valve 1 which is actuatable with shift pressure.

Figure 3:
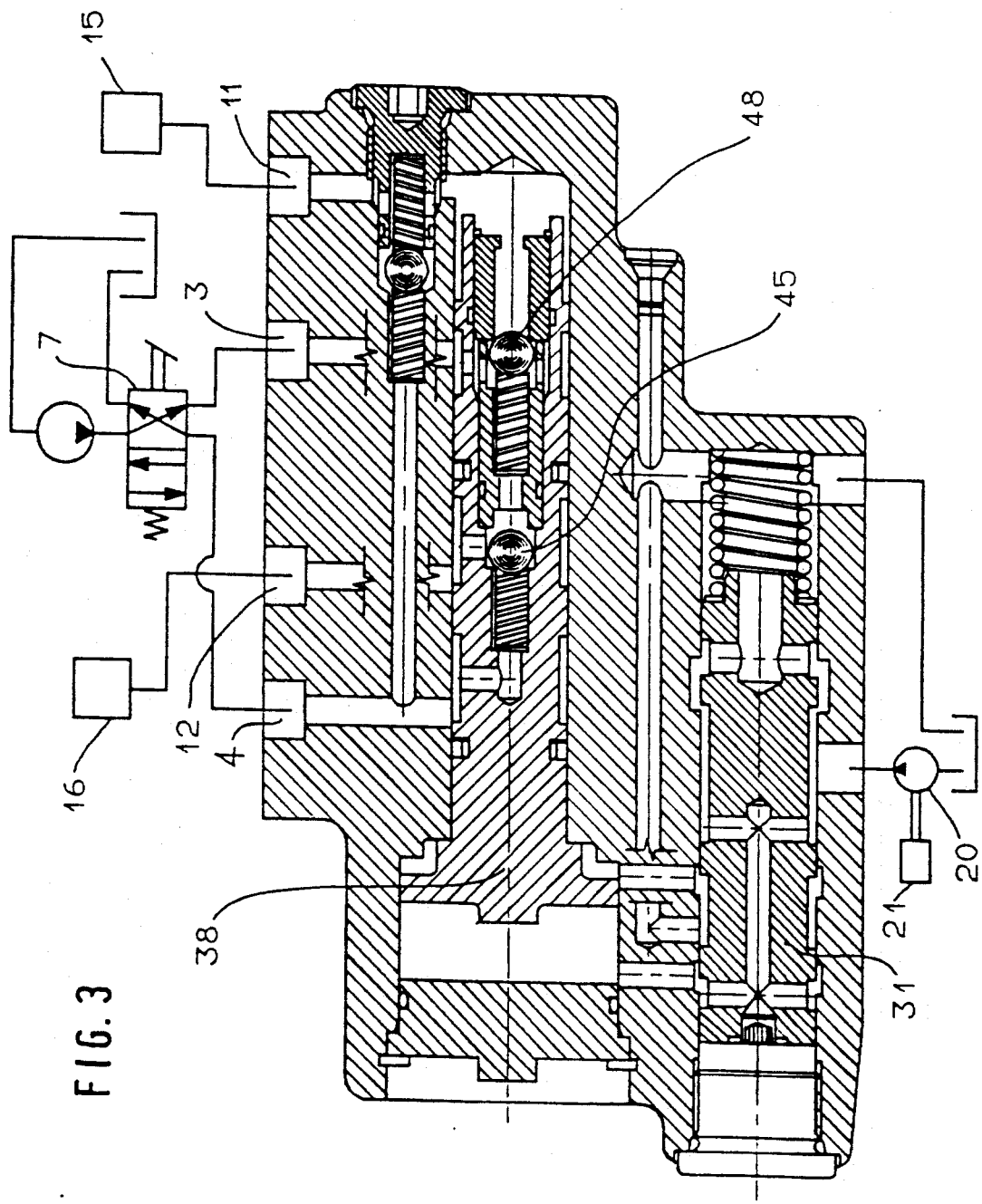
FIG. 3 is the longitudinal section of FIG. 2 wherein the valves are moved out of their neutral positions.

Herebelow is explained, in further detail, the operation of the down shift arrest device with reference to FIGS. 2 and 3. In FIG. 2 the arrest device is shown in its neutral position. Gear-shift valve 7 is likewise shown in its neutral position which corresponds to the position for the high gear. Change-over valves 45, 48 and 52 are shown in their neutral positions which are engaged when no pressure crops out.

When the first gear is to be engaged, gear-shift valve 7 is moved against the force of its compression spring so that a communication results from servopump 8 to first work line connection 3 and a return-flow communication from second work line connection 4 to tank 10. If the pressure produced by the low-pressure pump 20 is below the given value, that is, if the rpm of the low-pressure pump 20, and thus of prime mover 21, is below the given limit value of 800 U/min, for instance, then control-valve piston 31 remains in its left shift position. The pressure which is fed to annular surface 41 of pilot-valve piston 38 via pump connection 17, open control edge pair 33 and control duct 28 retains the pilot-valve piston 38 in its left shift position. The first work line connection 3 communicates via open control edge pair 44 with activation connection 11 for activation device 15 of the low gear. Activation connection 12 for activation device 16 of the high gear communicates via the first change-over valve 45 with second work line connection 4. The low gear is thus engaged.

If the rpm of low-pressure pump 20 is increased beyond the given limit value, then control-valve piston 31 is moved to the right by the corresponding pressure actuating upon its piston surface 36 against the force of compression spring 35 until control edge pair 34 creates a communication between low-pressure pump 20 and control duct 30 so that large end surface 40 is actuated with the pressure of low-pressure pump 20. But since a shift pressure which is about 8 to 10 times stronger than the pressure produced by the low-pressure pump 20 is acting in cylinder space 43 and thus on small end surface 42 of pilot-valve piston 38, pilot-valve piston 38 remains in its left shift position.

Only when the high gear is engaged by gear-shift valve 7 and first work line connection 3 is connected with the return flow to tank 10, does the pressure of low-pressure pump 20 acting upon the large end surface 40 move the pilot-valve piston 38 to the right. The shift pressure cropping out in second work line connection 4 is fed via change-over valve 45, which is in its right shift position, and the activation connection 12 to the activation device 16 for the high gear. The remaining pressure still prevalent in activation device 15 for the low gear is vented via second change-over valve 48 to first work line connection 3. This is made possible because compression spring 50 exerts only a very slight force upon the fastening body of change-over valve 48.

If in this state of operation, that is, when the high gear is engaged and the rpm of low-pressure pump 20 and of prime mover 21 is above the given limit value, the gear-shift valve 7 is moved to the position shown in FIG. 3, then the first work line connection 3 is actuated with shift pressure, which in the normal case, should be fed to activation device 15 for the low gear. But such a shift would lead to an overspeed of prime mover 21. The shift pressure fed to first work line connection 3 is therefore fed, via second change-over valve 48, (that is, in its right position,) and first change-over valve 45 pressed into its left position, to activation connection 12 for activation device 16 of the high gear. The high gear thus remains engaged.

Only when the rpm of prime mover 21 has been braked below the given limit value can there be produced a communication of first work line connection 3 to activation device 15 for the low gear by moving both control-valve piston 31 and pilot-valve piston 38 into their left shift positions.

Reference Numerals 1 pilot valve
2 control valve
3 first work line connection
4 second work line connection
5 work line
6 work line
7 gear-shift valve
8 servopump
9 -
11 activation connection
12 activation connection
13 activation line
14 activation line
15 activation device
16 activation device
17 pump connection
18 control line
19 -
20 low-pressure pump
21 prime mover
22 check valve
23 check valve
24 return pipe
25 tank
26 return-pipe connection
27 pressure-relief valve
28 control duct
29 -
30 control duct
31 control-valve piston
32 valve housing
33 control edge pair
34 control edge pair
35 compression spring
36 piston surface
37 control edge pair
38 pilot-valve piston
39 -
40 large end surface
41 annular surface
42 small end surface
43 cylinder space
44 control edge pair
45 first change-over valve
46 compression spring
47 valve seat
48 second change-over valve
49 -
50 compression spring
51 valve seat
52 third change-over valve
53 high-pressure seal

We claim:

1. An engine-rpm-dependent arrest device to prevent non-permitted down shifts in motor vehicle transmissions with at least two shiftable gears and one gear-shift valve (7) adjustable by the driver with a pilot valve (1) having two shift positions by which pressure medium under shift pressure can be fed through an activation connection (11, 12) of respective activation devices (15, 16) for a low and a high gear, and both shift positions are engageable by the pressure of the pressure medium, one shift position of said pilot valve (1) being engageable by actuating a piston surface of a pilot-valve piston (38) with pressure medium under shift pressure conveyed by a servopump (8) and with a control valve (2) having two shift positions of which one shift position is engageable by the force of a compression spring (35) and the other shift position by the pressure of an engine-rpm-dependent low-pressure pump (20) acting upon a piston surface (36) of a control-valve piston (31) and exceeding a given value, characterized in that said control valve (2) is exclusively in contact with the pressure medium conveyed by said low-pressure pump (20), said pilot-valve piston (38) of said pilot valve (1) is designed as a stepped piston having a large end surface (40) and an annular surface (41) which forms two piston surfaces actuatable with the pressure medium conveyed by said low-pressure pump (20) and a small end surface (42) which forms the piston surface actuatable with pressure medium under shift pressure, said control valve (2) has two control edge pairs (33, 34) for the alternative actuation of said large end surface (40) and of said annular surface (41) of said pilot-valve piston (38), said pilot valve (1) has two work line connections (3, 4) for two work lines (5, 6) leading to said gear-shift valve (7) which are alternatively actuated with shift pressure or connected with the return flow to a pressure medium tank (10), in both shifted gears a first of said five work line connections (3) communicates with said activation connection (11) for said activation device (15) of the low gear and a second of said two work line connections (4) communicates with said activation connection (12) for said activation device (16) of the high gear via said pilot valve (1), and when the high gear is engaged and at an rpm above a predetermined rpm in which the given value of the pressure of said low-pressure pump (20) is exceeded, an actuation of said activation device (15)

of the low gear with shift pressure is prevented by the fact that said first work line connection (3) coordinated with the low gear communicates via said pilot valve (1) with said activation connection (12) for said activation device (16) of the high gear.

2. An engine-rpm-dependent arrest device according to claim 1, characterized in that in said pilot valve (1) is situated a control edge pair (44) by which the communication of said first work line connection (3) to said activation connection (11) for said activation device (15) of the low gear can be opened or closed.

3. An engine-rpm-dependent arrest device according to claim 2, characterized in that in said pilot valve (1) are situated two change-over valves (45, 48)

- of which a first of the two is biased by change-over values force of a compression spring (46) into a position in which is opened a communication from said second work line connection (4) to said activation connection (12) for said activation device (16) of the high gear, and
- a second (48) of the two change-over values is movable by the force of a pressure prevalent in said activation connection (11) for said activation device (15) of the high gear into a position in which a communication from said first work line connection (3) to said activation connection (12) for said activation device (16) of the high gear is shut off, and when the high gear is engaged and at an rpm in which the given value of the pressure of said low-pressure pump (20) is exceeded and above said predetermined rpm in pre-selected low gear, said first and second change-over valves (45, 48) are moved by shift pressure cropping out on said first work line connection (3) into shift positions in which a communication of said first work line connection (3) to said activation connection (12) for said activation device (16) of the high gear is opened and a communication of said first work line connection (3) to said activation connection (11) for said activation device (15) of the low gear is shut off.

4. An engine-rpm-dependent arrest device according to claim 1, characterized in that in said pilot valve (1) is situated a high-pressure seal (53) which separates the part of said pilot valve (1) actuatable with low pressure and containing said large end surface (40) and said annular surface (41) of said pilot-valve piston (38) from the part of said pilot valve (1) actuatable with shift pressure.

5. An engine-rpm-dependent arrest device according to claim 3, characterized in that in said pilot valve (1) is situated a third change-over valve (52) which shuts off a communication of said second work line connection (4) and said activation connection (11) for said activation device (15) of the low gear whenever the shift pressure crops out in one of said connections.

6. An engine-rpm-dependent arrest device according to claim 1, characterized in that said control valve (2) has a third control edge pair (37) by which is formed, in combination with said compression spring (35) and said piston surface (36) of said control-valve piston (31), a pressure relief valve (27).

* * * * *